(12) United States Patent
Kim et al.

(10) Patent No.: US 11,193,649 B2
(45) Date of Patent: Dec. 7, 2021

(54) OPTICAL LENS AND LIGHTING DEVICE USING THE SAME

(71) Applicants: SL Corporation, Daegu (KR); POSTECH Research and Business Development Foundation, Pohang-si (KR)

(72) Inventors: Hyeong Do Kim, Gyeongsan-si (KR); Jong Woon Kim, Gyeongsan-si (KR); Junsuk Rho, Pohang-si (KR); Heonyeong Jeong, Pohang-si (KR); Hanlyun Cho, Pohang-si (KR); Younghwan Yang, Pohang-si (KR); Jaehyuck Jang, Pohang-si (KR); Inki Kim, Pohang-si (KR)

(73) Assignees: SL Corporation, Daegu (KR); POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 17/063,992

(22) Filed: Oct. 6, 2020

(65) Prior Publication Data

US 2021/0164636 A1 Jun. 3, 2021

(30) Foreign Application Priority Data

Dec. 2, 2019 (KR) .................. 10-2019-0157951

(51) Int. Cl.
*F21V 5/00* (2018.01)
*F21V 5/04* (2006.01)
*G02B 3/00* (2006.01)

(52) U.S. Cl.
CPC .............. *F21V 5/002* (2013.01); *F21V 5/007* (2013.01); *F21V 5/04* (2013.01); *G02B 3/0056* (2013.01); *G02B 2207/101* (2013.01)

(58) Field of Classification Search
CPC . F21V 5/002; G02B 3/0056; G02B 2207/101; G02B 5/1871; G02B 5/1866
See application file for complete search history.

(56) References Cited

U.S. PATENT DOCUMENTS 4,083,627 A * 4/1978 Okano ................. G02B 5/1871
 348/342
5,323,302 A * 6/1994 Bertling ................. F21S 43/26
 362/308

(Continued)

FOREIGN PATENT DOCUMENTS

DE 10 2019103 956 A1 9/2019
WO 2020/200931 A1 10/2020

OTHER PUBLICATIONS

Raymond Rumpf/EMPossible, Lecture 9 (EM21)—Diffraction gratings., Feb. 13, 2014, Accessed Jun. 16, 2021 (Year: 2014).*

(Continued)

*Primary Examiner* — Bryon T Gyllstrom
*Assistant Examiner* — Christopher E Dunay
(74) *Attorney, Agent, or Firm* — Nelson Mullins Riley & Scarborough LLP; Kongsik Kim, Esq.

(57) ABSTRACT

An optical lens capable of miniaturization and capable of easily implementing various optical characteristics and a lighting device using the same are provided. The optical lens includes a lens body including an incident surface and an emitting surface; and a plurality of nano holes that extend in a direction from the incident surface toward the emitting surface, and is formed to communicate with at least one of the incident surface or the emitting surface. In particular, the plurality of nano holes change a phase of light that is incident on the lens body.

13 Claims, 13 Drawing Sheets

(56) References Cited

U.S. PATENT DOCUMENTS

| | | | | |
|---|---|---|---|---|
| 5,370,768 | A * | 12/1994 | Mersereau | G02B 3/0018 |
| | | | | 216/26 |
| 10,883,671 | B2 * | 1/2021 | Bermudez | G02B 1/118 |
| 2008/0055723 | A1 * | 3/2008 | Gardner | G02B 5/3091 |
| | | | | 359/487.03 |
| 2008/0304159 | A1 * | 12/2008 | Chen | G02B 5/008 |
| | | | | 359/641 |
| 2010/0075114 | A1 | 3/2010 | Kurihara et al. | |
| 2010/0091371 | A1 * | 4/2010 | Chatani | B29D 11/00634 |
| | | | | 359/576 |
| 2016/0306167 | A1 * | 10/2016 | Mossberg | G02B 5/1866 |
| 2019/0044003 | A1 | 2/2019 | Heck et al. | |
| 2020/0025888 | A1 * | 1/2020 | Jang | H01S 5/18344 |
| 2021/0103159 | A1 * | 4/2021 | Hsu | G02B 5/1871 |

OTHER PUBLICATIONS

English Translation of First Office Action in German counterpart application DE 10 2020 213 994.6 received on Aug. 30, 2021.

\* cited by examiner (Related Art)

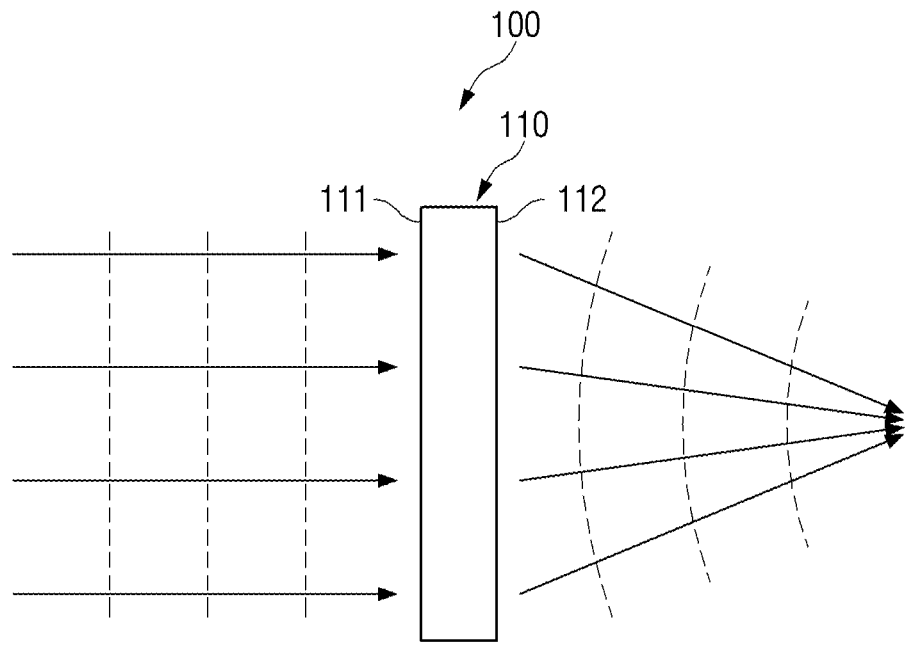
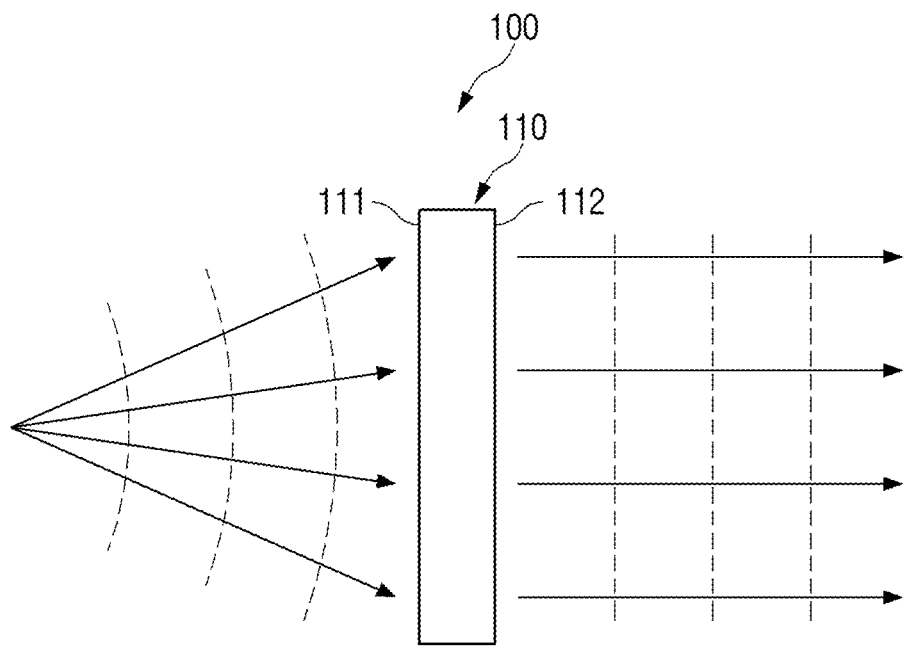

OPTICAL LENS AND LIGHTING DEVICE USING THE SAME

CROSS-REFERENCE TO RELATED APPLICATION

This application claims priority from Korean Patent Application No. 10-2019-0157951 filed on Dec. 2, 2019, which application is herein incorporated by reference in its entirety.

BACKGROUND

1. Technical Field

The present disclosure relates to an optical lens and a lighting device using the same. More specifically, it relates to an optical lens capable of miniaturization and capable of easily implementing various optical characteristics and a lighting device using the same.

2. Description of the Related Art

A meta structure refers to a structure designed and manufactured to have artificial characteristics that do not naturally exist by designing an appropriate geometric periodic structure using existing materials in a broad sense.

The meta structure is an artificial structure in which values smaller than a wavelength of incident light are applied to a thickness, pattern, or period. The meta structure may realize various optical characteristics with a high response speed, and is advantageous for application in a compact device. Therefore, there are continued attempts to apply it to changing the transmission, reflection, polarization, phase, intensity, path, or the like of incident light.

FIG. 1 is a schematic view showing a structure of an optical lens in the related art. The optical lens 10 according to the related art includes a support layer 11 and a plurality of nano pins 12 formed on the support layer 11 as a meta structure. The plurality of nano pins 12 are formed in a column shape on the support layer 11. A phase of light is delayed depending on a thickness, height, formation cycle, or the like of the plurality of nano pins 12 to achieve required optical characteristics.

In FIG. 1, since the plurality of nano pins 12 are spaced apart from each other and disposed separately, the support layer 11 for supporting the plurality of nano pins 12 is essentially required, and thus there is a limit in reducing the overall size. In addition, it is necessary to fix the plurality of nano pins 12 on the support layer 11 through an adhesion process. Therefore, the overall manufacturing process increases, and it is relatively vulnerable to the external environment, thereby increasing the possibility of breakage or damage to the plurality of nano pins 12.

Accordingly, there is a need for a method capable of miniaturizing optical lens while simplifying a manufacturing process and preventing breakage or damage caused by the external environment.

SUMMARY

Aspects of the present disclosure provide an optical lens with a meta structure that simplifies a manufacturing process and improves resistance to an external environment, and a lighting device using the same. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an optical lens may include a lens body having an incident surface and an emitting surface; and a plurality of nano holes that extend in a direction from the incident surface toward the emitting surface, and is formed to communicate with at least one of the incident surface or the emitting surface. In particular, the plurality of nano holes may change a phase of light that is incident on the lens body.

The plurality of nano holes may be formed to communicate with both the incident surface and the emitting surface. The plurality of nano holes may have a diameter that is less than a wavelength of light to be transmitted, the diameter being a maximum distance between two opposing points disposed on a circumference of a longitudinal cross-section of the plurality of nano holes. The diameter may be less than a half of the wavelength of the light to be transmitted. The plurality of nano holes may have a constant diameter along the direction from the incident surface toward the emitting surface. Alternatively, at least one of the plurality of nano holes may be formed such that a diameter thereof changes at least partly in the direction from the incident surface toward the emitting surface.

A length of the plurality of nano holes in the direction from the incident surface toward the emitting surface may be greater than a diameter thereof. A pitch distance between the plurality of nano holes may be greater than a maximum value among diameters of the plurality of nano holes. The pitch distance between the plurality of nano holes may be less than twice the maximum value among the diameters of the plurality of nano holes.

The lens body may have a mesh shape in which regions other than the plurality of nano holes are connected to each other. Further, a support layer for supporting the lens body may be included. The support layer may be made of a transparent material through which the light is transmitted.

The plurality of nano holes may be divided into a plurality of groups, and at least one of the plurality of groups may have different optical characteristics from another. The optical characteristics may comprise at least one of focusing, divergence, or deflection of the light.

According to an aspect of the present disclosure, a lighting device may include a light source unit including at least one light source; and an optical lens for delaying a phase of light that is incident from the light source unit to cause the light to proceed in at least one direction. In particular, the optical lens may comprise a plurality of nano holes formed to extend in a direction in which the light is emitted.

The optical lens may convert the light that is incident from the light source unit to a substantially parallel light beam and emits it. The optical lens may cause a first portion of the light incident from the light source unit to be emitted with a different optical characteristic from a second portion of the light. The optical characteristic may comprise at least one of focusing, divergence, or deflection of the light.

According to the optical lens of the present disclosure and the lighting device using the same as described above, one or more of the following benefits may be provided. A meta structure formed on a lens body may be implemented as nano holes that are in communication with at least one surface of the lens body. Therefore, a manufacturing process for forming the meta structure may be simplified, and resistance to external impacts may be improved. The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which:

FIGS. 5 and 6 are schematic views showing an optical path by the optical lens according to the exemplary embodiment of the present disclosure;

DETAILED DESCRIPTION

Figure 1:
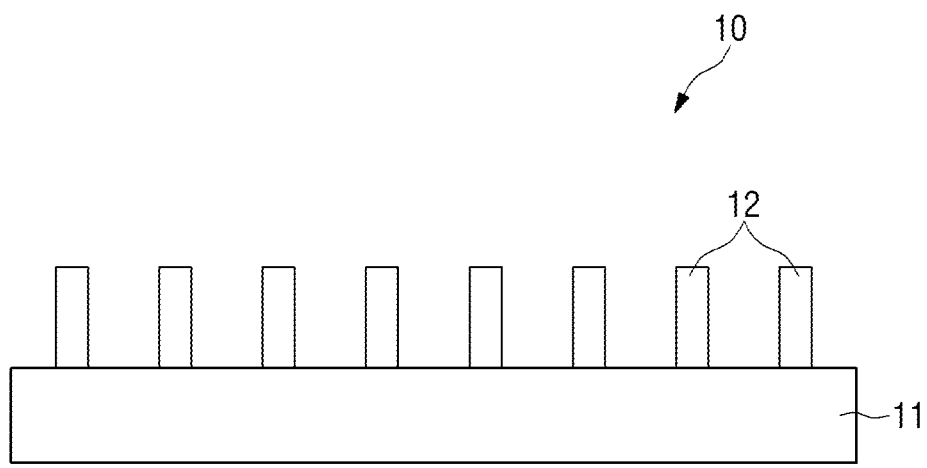
FIG. 1 is a schematic view showing an optical lens in the related art.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining an optical lens and a lighting device using the same according to exemplary embodiments of the present disclosure.

Figure 2:
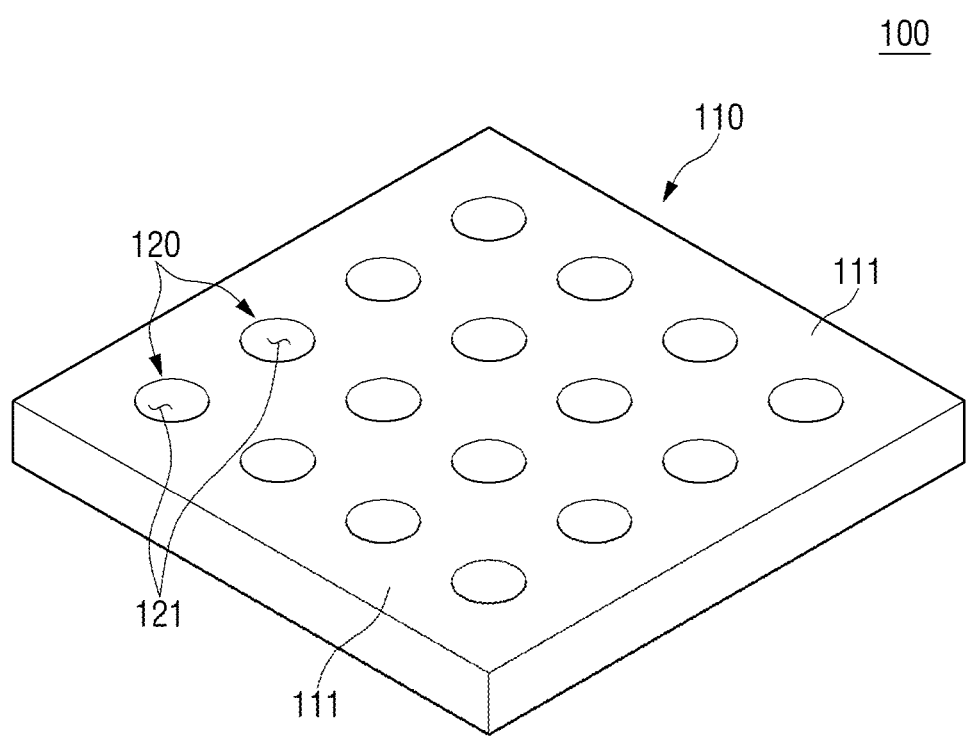
FIG. 2 is a perspective view showing an optical lens according to an exemplary embodiment of the present disclosure.
Figure 3:
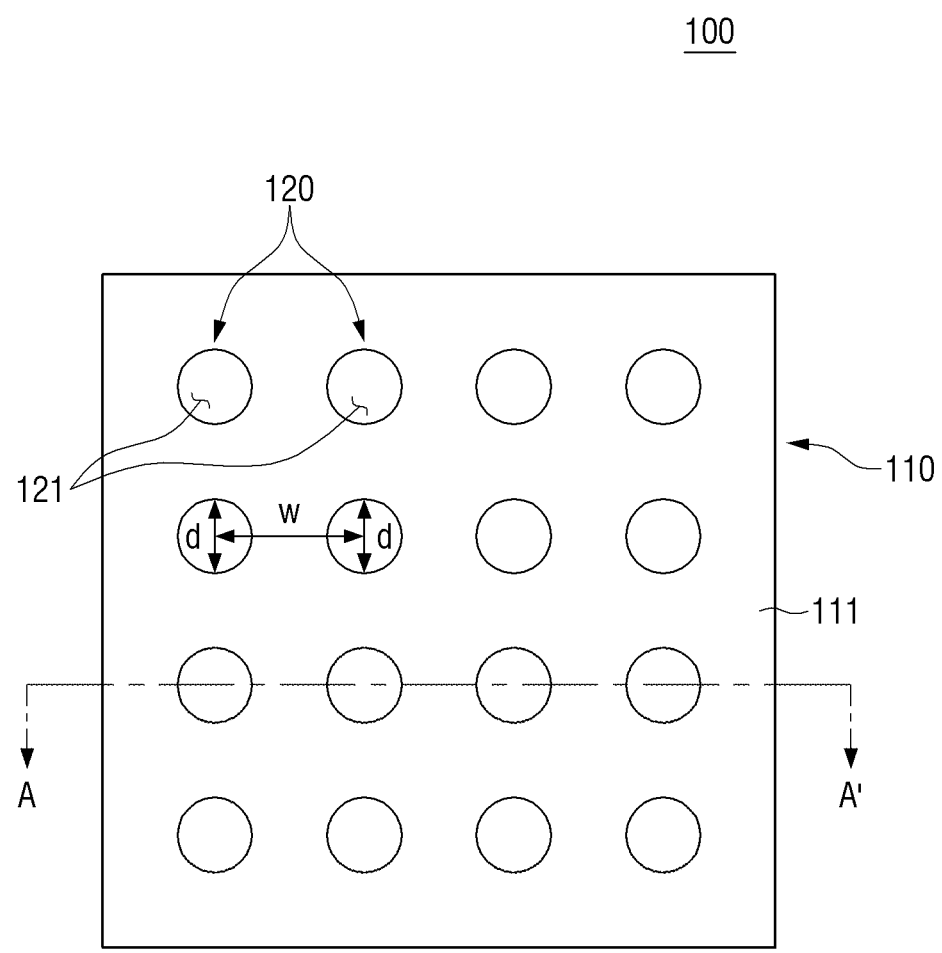
FIG. 3 is a plan view showing the optical lens according to the exemplary embodiment of the present disclosure.
Figure 4:
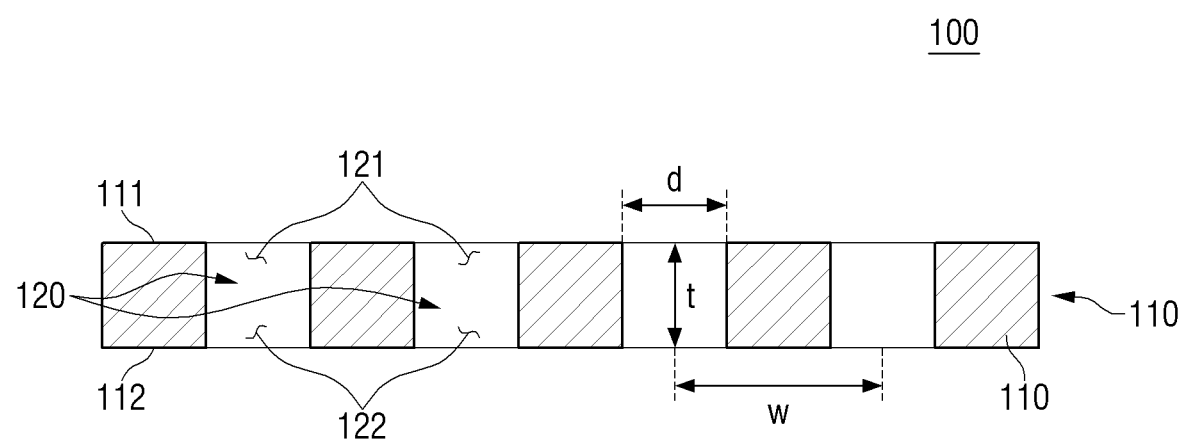
FIG. 4 is a sectional view taken along line A-A' in FIG. 3.

FIG. 2 is a perspective view showing an optical lens according to an exemplary embodiment of the present disclosure. FIG. 3 is a plan view showing the optical lens according to the exemplary embodiment of the present disclosure. FIG. 4 is a sectional view taken along line A-A' in FIG. 3. Referring to FIGS. 2 to 4, the optical lens 100 according to the exemplary embodiment of the present disclosure may include a lens body 110 and a plurality of nano holes 120.

In the exemplary embodiment of the present disclosure, the optical lens 100 may be applied to a lighting device provided in a vehicle, drone, train, or the like, which needs to secure a field of view in low light conditions such as nighttime operation. However, this usage is only an example for helping the understanding of the present disclosure, and the present disclosure is not limited thereto. The optical lens 100 of the present disclosure may be applied to a device that requires various optical characteristics, such as an optical filter, an optical sensor, a display element, or the like as well as a lighting device.

The optical lens 100 of the present disclosure may adjust a refractive power by changing a phase of incident light to change a shape of a wave front that connects the same phase points of the light. Consequently, the optical lens 100 may allow optical characteristics of light such as focusing, divergence and deflection, or the like to be obtained. The optical characteristics implemented by the optical lens 100 of the present disclosure are not limited to examples described above, and it may include various optical characteristics required in a device to which the optical lens 100 of the present disclosure is applied.

For example, as shown in FIG. 5, the optical lens 100 of the present disclosure may convert an incident plane wave into a spherical wave and may emit light to allow the emitted light to be focused at a particular point. In addition, as shown in FIG. 6, the optical lens 100 of the present disclosure may convert an incident spherical wave that is incident from a point into a plane wave and may emit it as parallel light. In FIGS. 5 and 6, the dotted lines represent a wave front.

FIGS. 5 and 6 as described above are examples where the optical lens 100 of the present disclosure performs a function of a convex lens. However, these examples are only for helping the understanding of the present disclosure, and the present disclosure is not limited thereto. The optical lens 100 of the present disclosure may perform functions of various types of lenses that focus, diverge, or deflect light depending on a degree of phase delay by each of the plurality of nano holes 120.

Herein, the phase of light may be regarded as a relative angle of the light represented by a trigonometric function at a specific location and time. Delaying the phase of light may be understood to mean that the light in the form of waves is transmitted slower than without the delaying of the phase. Therefore, it may be understood that the degree to which the phase of light is delayed by each of the plurality of nano holes 120 is different where the light transmits faster or slower through one of the plurality of the nano holes 120 than another of the plurality of nano holes 120. By appropriately adjusting the degree of the phase delay of the light by each of the plurality of nano holes 120, i.e., by adjusting the degree of refraction, the shape of the wave front may be changed. Therefore, as described in FIGS. 5 and 6, the spherical wave may be converted to the plane wave or the plane wave may be converted to the spherical wave.

In the exemplary embodiment of the present disclosure, the optical lens 100 may adjust the refractive power depending on the degree of the phase delay imposed by each of the plurality of nano holes 120 to adjust the path of light. However, the present disclosure is not limited to adjusting the refractive power, and it is also possible to adjust light transmittance or the like that affects brightness.

The refractive power or a focal length implemented by the optical lens 100 of the present disclosure may be adjusted depending on dimensions of each of the plurality of nano holes 120 defined by a diameter d and a length t. Compared to the conventional lens of the related art that adjusts the refractive power by thickness or curvature of the lens, the refractive power of the optical lens 100 according to the present disclosure may be adjusted without changing overall size of the lens.

The lens body 110 may be formed of a material having a low absorption rate in a wavelength band of incident light in order to achieve a high transmittance. The higher the refractive index, the higher the light modulation efficiency may become and the smaller the plurality of nano holes 120 may be formed, thus reducing the burden on the manufacturing process.

The plurality of nano holes 120 may be formed to extend in a direction from an incident surface 111 of the lens body 110 toward an emitting surface 112 thereof, and may be formed to communicate with at least one of the incident surface 111 or the emitting surface 112. The incident surface 111 and the emitting surface 112 of the lens body 110 may refer to a surface on which light is incident and a surface from which light is emitted, respectively. It may be understood that, depending on a device to which the optical lens 100 of the present disclosure is applied, one of both surfaces of the lens body 110 may become the incident surface 111 in a direction in which light is transmitted, and the other may serve as the emitting surface 112.

Each of the plurality of nano holes 120 may delay (or adjust) the phase of the incident light to allow the required optical characteristics to be obtained. In the exemplary embodiment of the present disclosure, a meta structure may be formed in a hole shape instead of the column shape as in the related art, thereby simplifying the manufacturing process and improving the resistance to the impacts from the external environment.

Figure 7:
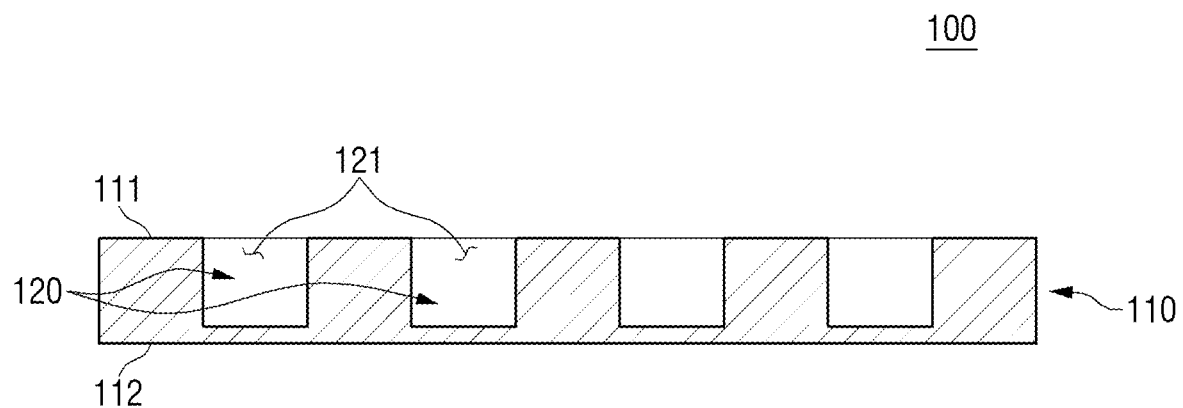
FIGS. 7 and 8 are cross-sectional views showing the optical lens according to the exemplary embodiment of the present disclosure.
Figure 8:
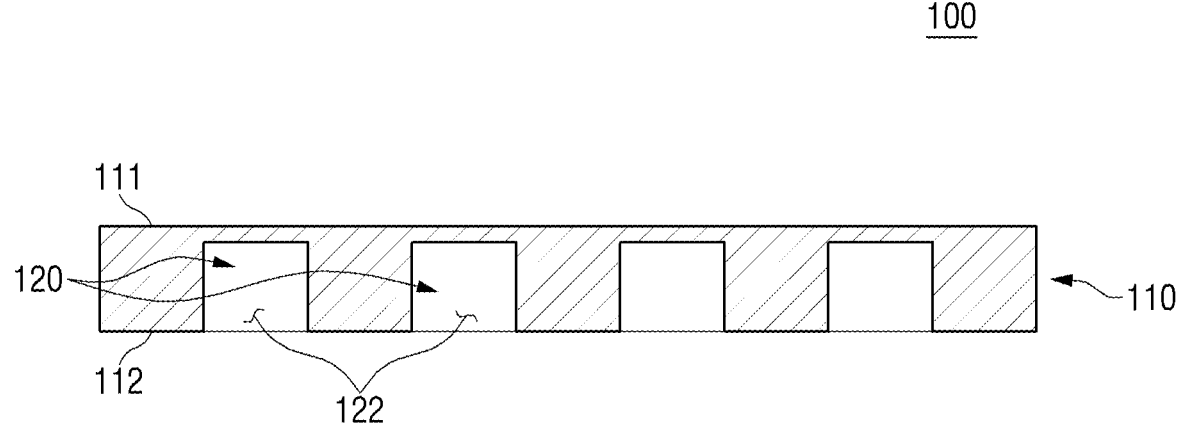

In the exemplary embodiment of the present disclosure, both sides of the plurality of nano holes 120 may be formed to communicate with the incident surface 111 and the emitting surface 112 of the lens body 110, respectively, so that the incident surface 111 and the emitting surface 112 of the lens body 110 are communicated with each other by the plurality of nano holes 120. However, the present disclosure is not limited thereto. As shown in FIGS. 7 and 8, the plurality of nano holes 120 may be formed to communicate with either one of the incident surface 111 or the emitting surface 112 of the lens body 110. In this case, a distance between a shielding surface of the incident surface 111 and the emitting surface 112 and the plurality of nano holes 120 may be determined based on a required light transmittance.

Openings 121 and 122 may be formed on both sides of the plurality of nano holes 120 to communicate with the incident surface 111 and the emitting surface 112 of the lens body 110. Hereinafter, in the exemplary embodiment of the present disclosure, the opening 121 that communicates with the incident surface 111 of the lens body 110 is referred to as an incident side opening, and the opening 122 that communicates with the emitting surface 112 of the lens body 110 will be referred to as an emitting side opening.

The plurality of nano holes 120 may be formed using a process such as etching or lithography of the lens body 110. The plurality of nano holes 120 may have different degrees of phase delay of light depending on the dimensions, and the dimensions of the plurality of nano holes 120 may be defined by a diameter d and a length t.

When the plurality of nano holes 120 are formed in the lens body 110 as described above, the lens body 110 may have a mesh shape in which regions other than the plurality of nano holes 120 are connected to each other. As a result, the possibility of breakage or damage may be reduced, and the resistance to the external impact such as shock, vibration, and/or heat may be increased as compared to the case where the meta structure is formed in the column shape.

Herein, the diameter d of the plurality of nano holes 120 may be defined as the longest distance between two opposing points disposed on an intersecting plane between the nano holes and a plane parallel to the incident surface 111, the two opposing points constituting the circumference of the incident side opening 121. In other words, the diameter d may be the maximum distance between two opposing points disposed on the circumference of a longitudinal cross-section of the plurality of nano holes. In the exemplary embodiment of the present disclosure, it is described as an example in which the incident side opening 121 is circular, and thus the diameter d may be understood as a diameter of a circle.

Figure 9:
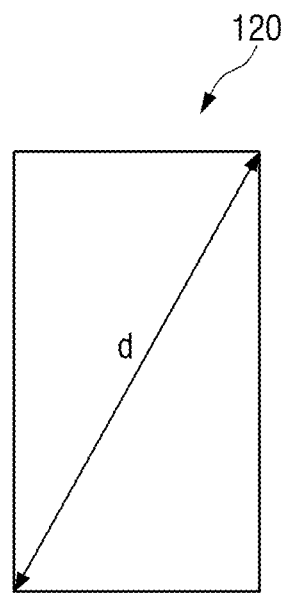
FIGS. 9 and 10 are schematic views showing a shape of a nano hole according to the exemplary embodiment of the present disclosure.
Figure 10:
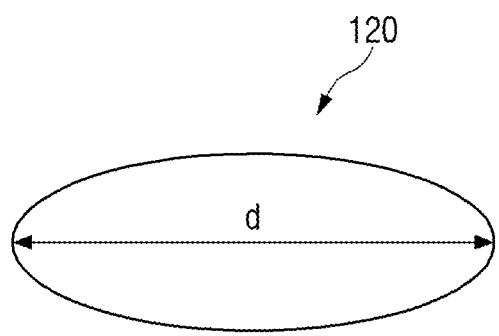

In the exemplary embodiment of the present disclosure, it is described as an example in which shape of the plurality of nano holes 120 is circular. However, depending on the degree of phase delay of the light, it may have various shapes such as a square and an oval. In this case, the diameter d may be the longest distance between the two opposing points located on the same plane as shown in FIGS. 9 and 10. As such, the diameter d may be understood as a representative feature size, a nominal dimension, a maximum width of the nano hole, or the like. The shape of the plurality of nano holes 120 is not limited to the example as described above, and may have a variety of shapes, such as a linear shape, a curved line, or a combination thereof, depending on the degree of the phase delay of the light.

The diameter d of the plurality of nano holes 120 may be smaller than the wavelength of the light to be transmitted. This is because the diameter d of the plurality of nano holes 120 that is sufficiently smaller than the wavelength of the light to be transmitted may be established as an effective medium theory, that is, a medium having an effective refractive index. In addition, this is to ensure that a range of the phase delay of the light encompasses whole $2\pi$, i.e., 0 to 360 degrees, to allow phase delay for all angles to be possible.

For example, when the wavelength of the light to be transmitted is 100 to 1400 nm, the diameter d of the plurality of nano holes 120 may be 20 to 1000 nm. Here, when the wavelength of the light is 100 to 1400 nm, it is an example of the case where the optical lens 100 of the present disclosure is also applied to an optical filter or an optical sensor using infrared and ultraviolet light, including visible light. When the optical lens 100 of the present disclosure is applied to a lighting device using visible light, the diameter d of the plurality of nano holes 120 may be 20 to 400 nm.

The plurality of nano holes 120 may have different diameters d depending on the shape of the holes. When a maximum value of the diameters d of the plurality of nano holes 120 is formed to be less than half of the wavelength of the light to be transmitted, it satisfies the effective medium theory while allowing the range of the phase delay of the light to cover the entire $2\pi$.

In addition, the length t of the plurality of nano holes 120 may be defined as the length of the hole in a direction from the incident surface 111 of the lens body 110 toward the emitting surface 112 thereof. When the incident side opening 121 and the emitting side opening 122 of the plurality of nano holes 120 are formed to communicate with the incident surface 111 and the emitting surface 112 of the lens body 110, respectively, the length t of the plurality of nano holes 120 may correspond to a thickness of the lens body 110. When either of both sides of the plurality of nano holes 120 is formed to communicate with one of the incident surface 111 or the emitting surface 112 of the lens body 110, the length t of the plurality of nano holes 120 may be smaller than the thickness of the lens body 110.

In the exemplary embodiment of the present disclosure, the lengths t of the plurality of nano holes 120 may be uniform for all of the plurality of nano holes 120. However, the present disclosure is not limited thereto, and some of the plurality of nano holes 120 may have different lengths from others. The length t of the plurality of nano holes 120 may satisfy a condition that the range of the phase delay of the light encompasses the entire $2\pi$ while reducing light loss. To this end, the length t of the plurality of nano holes 120 may be formed to be greater than the diameter d.

For example, when the wavelength of the light to be transmitted is 100 to 1400 nm and the diameter d of the plurality of nano holes 120 is 20 to 1000 nm, the length t of the plurality of nano holes 120 may be 200 to 1200 nm. When the optical lens 100 of the present disclosure is applied to a lighting device using visible light and the diameter d of the plurality of nano holes 120 is formed to 20 to 400 nm, the length t of the plurality of nano holes 120 may be 400 to 800 nm.

Figure 11:
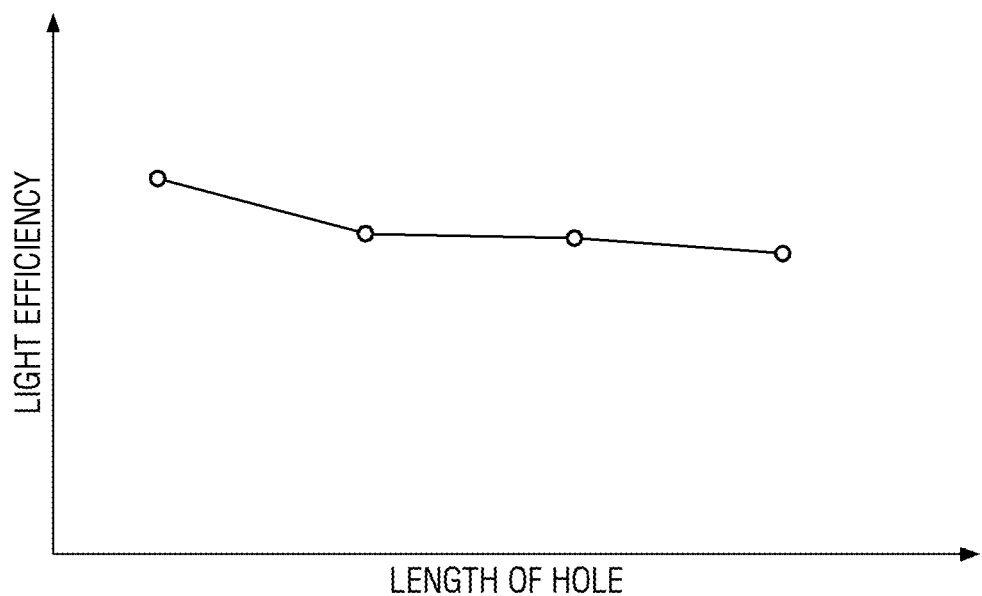
FIG. 11 is a schematic view showing light efficiency depending on a length of the nano hole according to the exemplary embodiment of the present disclosure.

As the length t of the plurality of nano holes 120 increases, the light loss may increase. Accordingly, the maximum length of the plurality of nano holes 120 may be varied based on the required light efficiency. In other words, as shown in FIG. 11, the light efficiency may gradually decrease as the length of the plurality of nano holes 120 increases. Therefore, the maximum length of the plurality of nano holes 120 may be determined based on the required light efficiency.

Figure 12:
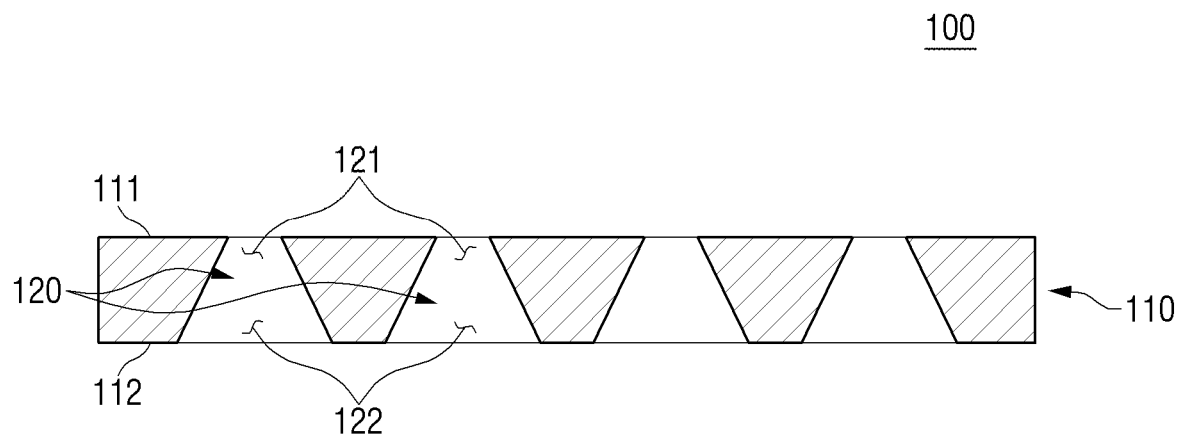
FIGS. 12 and 13 are schematic views showing a diameter of the nano hole according to the exemplary embodiment of the present disclosure.

In the exemplary embodiment of the present disclosure as described above, the plurality of nano holes 120 have a constant diameter d along the direction from the incident surface 111 of the lens body 110 toward the emitting surface 112 thereof. However, the present disclosure is not limited thereto, and the diameter d may gradually increase going from the incident surface 111 to the emitting surface 112 as shown in FIG. 12. However, the present disclosure is not limited thereto, and some of the plurality of nano holes 120 may have different diameters from others in the direction from the incident surface 111 to the emitting surface 112 depending on the degree of the phase delay of the light by the plurality of nano holes 120.

A forming cycle w of the plurality of nano holes 120 (e.g., a pitch distance between the plurality of nano holes 120) may be greater than the maximum value of the diameters d of the plurality of nano holes 120. This is because, when the forming cycle w is less than the maximum value of the diameters d, the diameter d of the nano holes that may be formed in the lens body 110 is limited, so that the range of the phase delay of the light may be difficult to cover the entire $2\pi$. In addition, the forming cycle w of the plurality of nano holes 120 may be 2 times or less of the maximum value of the diameters d of the plurality of nano holes 120. This is because, when the forming cycle w exceeds twice the maximum value of the diameters d, a number of the nano holes causing the phase delay per unit area (e.g., an areal density) is decreased, and thus it may be difficult to achieve the required optical characteristics. Therefore, the forming cycle w of the plurality of nano holes 120 may be greater than d and less than 2*d.

For example, when the diameter d of the plurality of nano holes 120 is 20 to 1000 nm, the forming cycle w may be 200 to 1200 nm. When the optical lens 100 of the present disclosure is applied to a lighting device using visible light and the diameter d of the plurality of nano holes 120 is formed to 20 to 400 nm, the forming cycle w of the plurality of nano holes 120 may be 400 to 600 nm.

Figure 13:
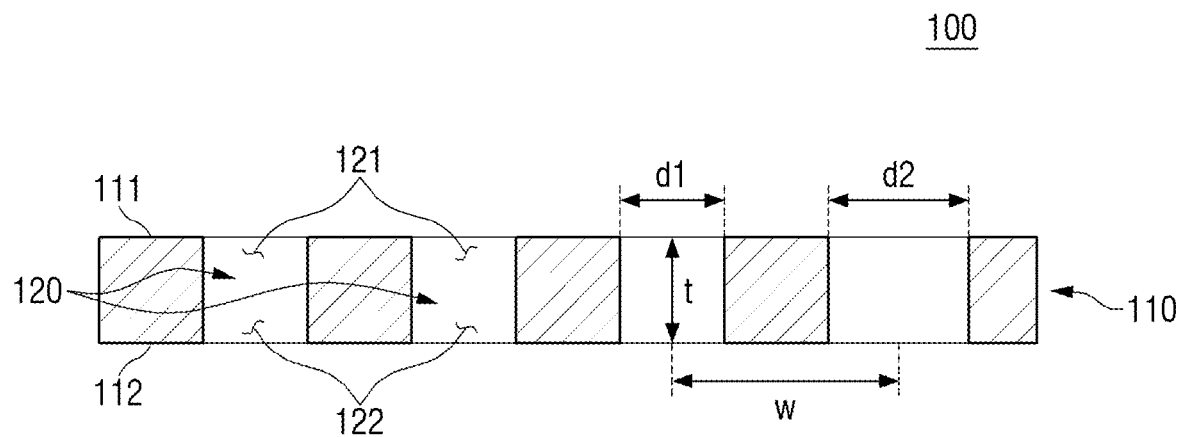

In the exemplary embodiment of the present disclosure as described above, the diameters d of the plurality of nano holes 120 may be uniform. However, the present disclosure is not limited thereto, and the diameters d of the plurality of nano holes 120 may be non-uniform depending on the degree of the phase delay by each nano hole. As shown in FIG. 13, when the diameters of adjacent nano holes are different from each other as d1 and d2, and the maximum value of the diameters is d2, the forming cycle w may be greater than d2 and less than 2*d2.

As described above, in the optical lens 100 of the present disclosure, the plurality of nano holes 120 may be directly formed on the lens body 110. Therefore, compared to the case where the nano pins are individually formed in the shape of columns as in the related art, not only may the resistance to the external impact such as shock, vibration, and/or heat be improved, but also the manufacturing process may be simplified to reduce costs.

In other words, conventionally, since a plurality of nano pins are individually formed, they are more sensitive to shock, vibration, heat, or the like, and thus the probability of breakage or damage to each nano pin is relatively high. Conversely, in the exemplary embodiment of the present disclosure, due to the structure in which the plurality of nano holes 120 are formed in the lens body 110 itself, the resistance to the external environment may be improved.

In addition, the optical lens 100 of the present disclosure may experience minimal contraction or expansion due to a temperature change, and it is possible to correct chromatic aberration sufficiently even with a single optical lens. Therefore, since it is not necessary to use multiple lenses to correct chromatic aberration due to the temperature change, the structure may be more easily miniaturized.

Figure 14:
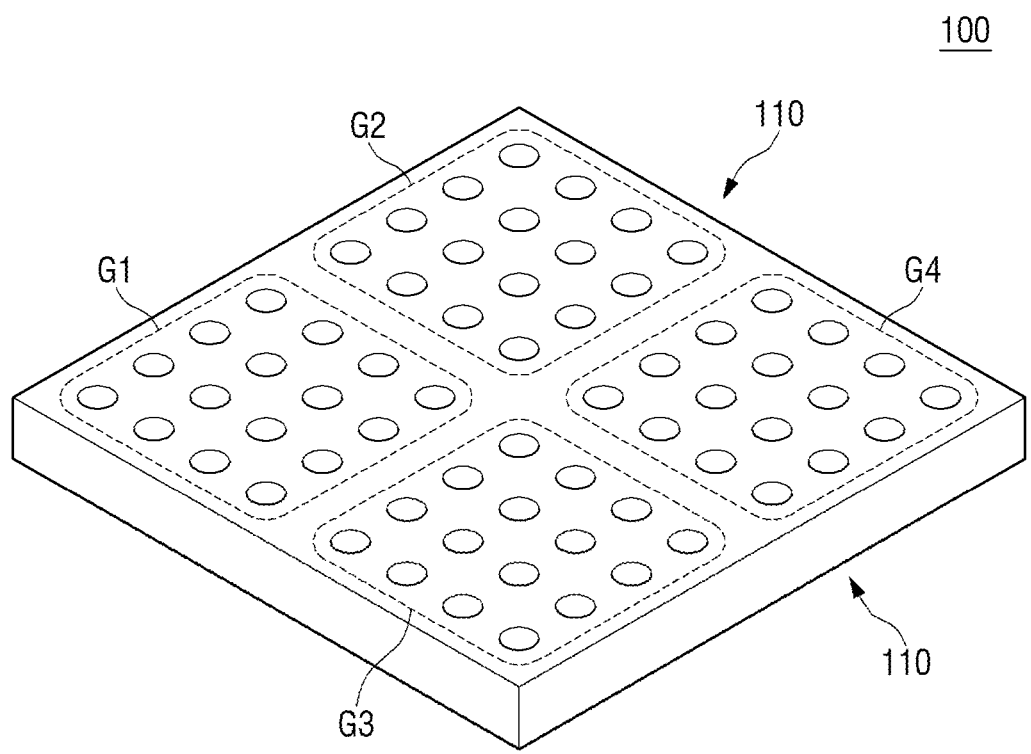
FIG. 14 is a schematic view showing the optical lens in which a plurality of nano holes formed in a lens body is divided into a plurality of groups, in accordance with the exemplary embodiment of the present disclosure.

The optical lens 100 of FIGS. 2 to 4 as described above is an example of implementing one optical characteristic. However, the present disclosure is not limited thereto. As shown in FIG. 14, when a plurality of groups G1-G4 including at least one nano hole are formed in the lens body 110 and nano holes included in each group G1-G4 are designed to have different optical characteristics, more than one optical characteristic may be obtained with a single optical lens. In FIG. 14, it is described as an example in which the plurality of groups G1-G4 are formed in one lens body 110. However, the present disclosure is not limited thereto, and each group may be formed on a separate lens body.

Figure 15:
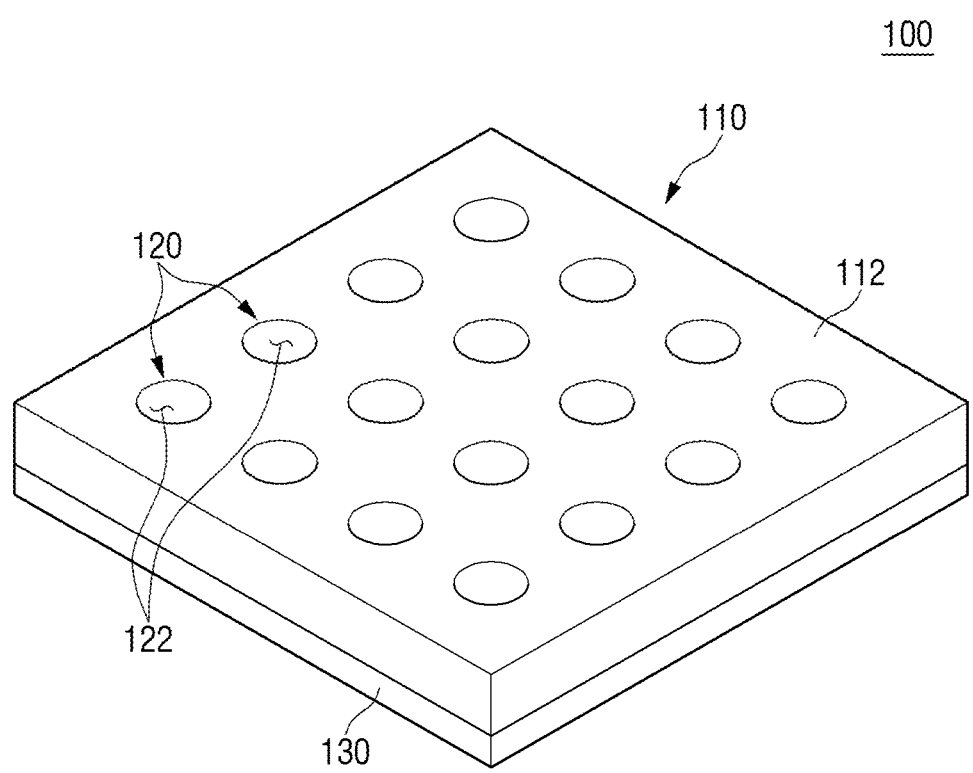
FIG. 15 is a perspective view showing an optical lens according to another exemplary embodiment of the present disclosure.
Figure 16:
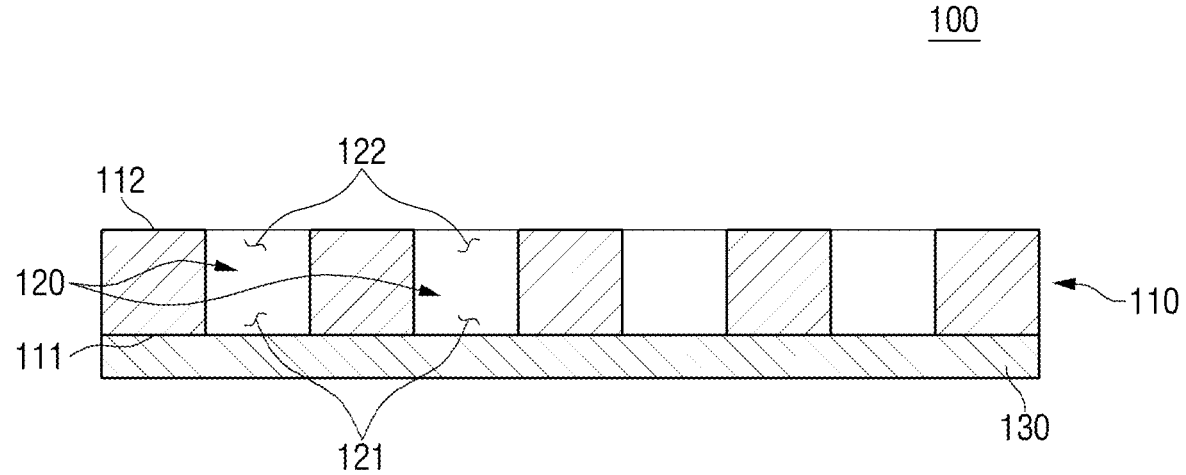
FIG. 16 is a cross-sectional view showing the optical lens according to the another exemplary embodiment of the present disclosure.

FIG. 15 is a perspective view showing an optical lens according to another exemplary embodiment of the present disclosure, and FIG. 16 is a side view showing the optical lens according to the another exemplary embodiment of the present disclosure. Referring to FIGS. 15 and 16, the optical device 100 according to the another exemplary embodiment of the present disclosure may include the lens body 110, the plurality of nano holes 120, and a support layer 130. In the another exemplary embodiment of the present disclosure, the support layer 130 may support the lens body 110 to improve the rigidity of the lens body 110, thereby preventing deformation, breakage, damage, or the like of the lens body 110 due to the external impacts.

In FIGS. 15 and 16, it is described as an example in which the support layer 130 is formed on the incident surface 111 of the lens body 110. However, this configuration is only an example for helping the understanding of the present disclosure, and the present disclosure is not limited thereto. The support layer 130 may be formed on at least one of the incident surface 111 or the emitting surface 112 of the lens body 110 depending on a focal length of the optical lens 100, a thickness of the support layer 130, or the like.

The support layer 130 may be made of glass or a polymer material such as polymethyl methacrylate (PMMA) or polydimethylsiloane (PDMS), and may be made of a transparent material through which light may be transmitted. The support layer 130 may improve the assembling property when assembling the optical lens 100 that is manufactured in a small size. However, this configuration is only an example for helping the understanding of the present disclosure, and the present disclosure is not limited thereto. The support layer 130 may be omitted when sufficient assembly property is achieved by the optical lens 100 of the present disclosure without the support layer 130.

Figure 17:
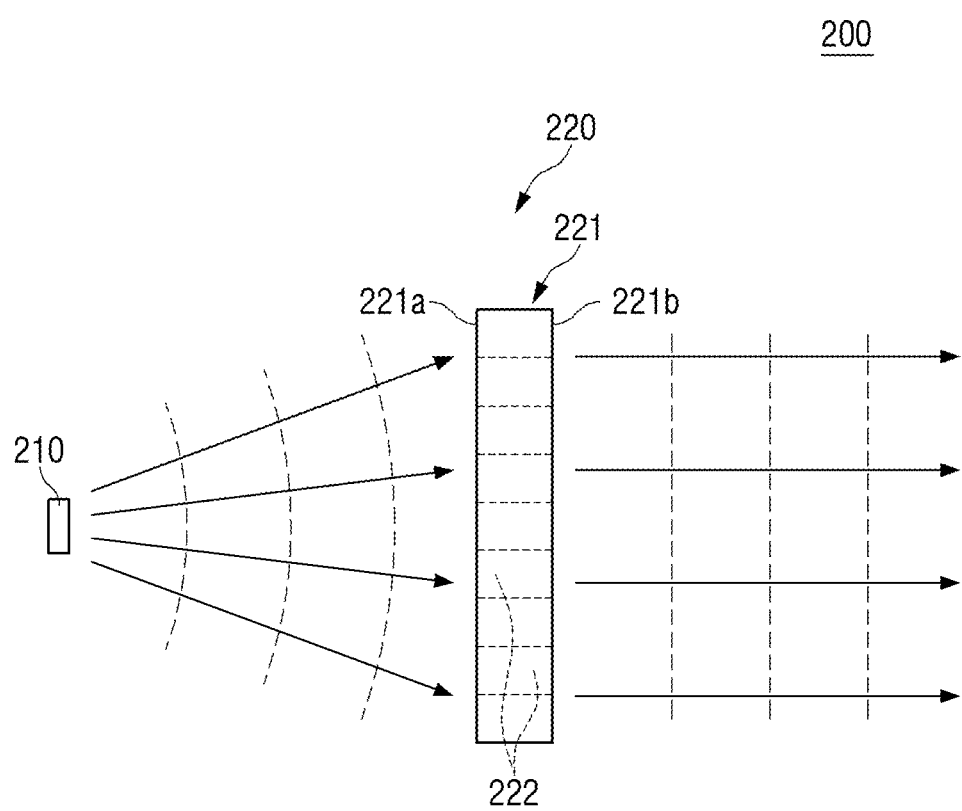
FIG. 17 is a schematic view showing a lighting device according to an exemplary embodiment of the present disclosure.

FIG. 17 is a schematic view showing a lighting device according to an exemplary embodiment of the present disclosure. Referring to FIG. 17, the lighting device 200 according to the exemplary embodiment of the present disclosure may include a light source unit 210 and an optical lens 220. In FIG. 17, the optical lens 220 may be similar to the optical lens 100 of the exemplary embodiments as described above, and a detailed description thereof will be omitted.

In the exemplary embodiment of the present disclosure, the lighting device 200 may perform a function of a vehicle lamp to ensure that a forward view is secured when the vehicle is operating in low light conditions (e.g., at night or in a tunnel), or to inform the vehicles or pedestrians in the vicinity of the vehicle. When the lighting device 200 performs the function of the vehicle lamp, an appropriate beam pattern may be formed depending on the function.

The light source unit 210 may include at least one light source. The optical lens 220 may include a plurality of nano holes 222 that communicate between an incident surface 221a and an emitting surface 221b of a lens body 221, so that the light generated from the light source unit 210 with a predetermined light irradiation angle may proceed in at least one direction by the optical lens 220.

FIG. 17 is an example of the case in which the light generated from the light source 210 with the predetermined light irradiation angle is converted to a substantially parallel light beam by the optical lens 220 and irradiated to the front of the vehicle to provide a forward illumination with a sufficient viewing distance. However, the present disclosure is not limited thereto. The light generated from the light source unit 210 may be formed to proceed in two or more directions depending on the degree of the phase delay of each of the plurality of nano holes 222 that are formed in the optical lens 220 to generate various beam patterns depending on the driving environment of the vehicle.

In addition, in FIG. 17, it is described as an example in which the light source unit 210 includes a single light source. However, the present disclosure is not limited thereto, and the light source unit 210 may include a plurality of light sources. In this case, the optical lens 220 may delay the phase of light generated from each of the plurality of light sources to form a suitable beam pattern.

As described above, the optical lenses 100 and 220 of the present disclosure and the lighting device 200 using the same may be implemented as meta structures, in which the plurality of nano holes 120 and 222 are formed in the lens bodies 110 and 221. Therefore, the manufacturing process may be simplified, and the resistance to the external impact may be improved. In addition, since it is possible to realize various optical characteristics by the optical lenses 100 and 220, miniaturization is possible.

In concluding the detailed description, those skilled in the art will appreciate that many variations and modifications can be made to the exemplary embodiments without departing from the principles of the present disclosure. Therefore, the disclosed exemplary embodiments of the disclosure are used in a generic and descriptive sense only and not for purposes of limitation.

What is claimed is:
1. An optical lens, comprising:
    a lens body including an incident surface and an emitting surface; and
    a plurality of nano holes that extend in a direction from the incident surface toward the emitting surface, and is formed to communicate with at least one of the incident surface or the emitting surface,
    wherein the plurality of nano holes change a phase of light that is incident on the lens body,
    wherein the plurality of nano holes are divided into at least two groups within the lens body, and
    wherein a first group of the plurality of nano holes collectively perform a different optical function from a second group of the plurality of nano holes, the optical function being light convergence, divergence, or deflection.

2. The lens of claim 1, wherein the plurality of nano holes are formed to communicate with both the incident surface and the emitting surface.

3. The lens of claim 1, wherein the plurality of nano holes have a diameter that is less than a wavelength of light to be transmitted, the diameter being a maximum distance between two opposing points disposed on a circumference of a longitudinal cross-section of the plurality of nano holes.

4. The lens of claim 3, wherein the diameter is less than a half of the wavelength of the light to be transmitted.

5. The lens of claim 1, wherein the plurality of nano holes have a constant diameter along the direction from the incident surface toward the emitting surface.

6. The lens of claim 1, wherein at least one of the plurality of nano holes is formed such that a diameter thereof changes at least partly along the direction from the incident surface toward the emitting surface.

7. The lens of claim 1, wherein a length of the plurality of nano holes in the direction from the incident surface to the emitting surface is greater than a diameter thereof.

8. The lens of claim 1, wherein a pitch distance between the plurality of nano holes is greater than a maximum value among diameters of the plurality of nano holes.

9. The lens of claim 8, wherein the pitch distance between the plurality of nano holes is less than twice the maximum value among the diameters of the plurality of nano holes.

10. The lens of claim 1, wherein the lens body has a mesh shape in which regions other than the plurality of nano holes are connected to each other.

11. The lens of claim 1, further comprising:
a support layer for supporting the lens body,
wherein the support layer includes a transparent material through which the light is transmitted.

12. A lighting device, comprising:
a light source unit including at least one light source; and
an optical lens for delaying a phase of light that is incident from the light source unit to cause the light to proceed in at least one direction,
wherein the optical lens comprises a plurality of nano holes formed to extend in a direction in which the light is emitted,
wherein the plurality of nano holes are divided into at least two groups within the optical lens, and
wherein a first group of the plurality of nano holes collectively perform a different optical function from a second group of the plurality of nano holes, the optical function being light convergence, divergence, or deflection.

13. The device of claim 12, wherein the optical lens converts the light that is incident from the light source unit to a substantially parallel light beam and emits it.

* * * * *